United States Patent [19]

Larkins et al.

[11] Patent Number: 5,189,355
[45] Date of Patent: Feb. 23, 1993

[54] INTERACTIVE ROTARY CONTROLLER SYSTEM WITH TACTILE FEEDBACK

[75] Inventors: David N. Larkins, Fremont; Glenn T. Yoshida, Cupertino; Thomas L. Helmers, San Jose, all of Calif.

[73] Assignee: Ampex Corporation, Redwood City, Calif.

[21] Appl. No.: 866,695

[22] Filed: Apr. 10, 1992

[51] Int. Cl.⁵ ............................................. H02K 29/12
[52] U.S. Cl. .................... 318/685; 318/126; 318/145; 318/86; 318/368; 318/459; 388/928.1
[58] Field of Search .......... 318/80, 126, 129, 145–147, 318/159, 748, 799, 278, 363, 368, 459, 474, 500, 696, 685, 63, 86, 87, 703; 388/928.1

[56] References Cited

U.S. PATENT DOCUMENTS

| | | | |
|---|---|---|---|
| 2,776,814 | 1/1957 | Sparks | 254/150 |
| 3,328,858 | 6/1967 | Thompson | 318/138 |
| 3,435,314 | 3/1969 | Bradley et al. | 318/138 |
| 3,465,349 | 9/1969 | Schoeneman | 346/74 |
| 3,931,562 | 1/1976 | Visscher | 318/685 |
| 4,066,941 | 1/1978 | Foster | 318/341 |
| 4,085,355 | 4/1978 | Fradella | 318/168 |
| 4,107,585 | 8/1978 | Waddington | 318/331 |
| 4,112,340 | 9/1978 | Clarke | 318/331 |
| 4,144,481 | 3/1979 | Clarke | 318/331 |
| 4,417,288 | 11/1983 | Hattori et al. | 360/74.1 |
| 4,458,273 | 7/1984 | Johnson | 360/74.1 |
| 4,560,983 | 12/1985 | Williams | 340/825 |
| 4,779,260 | 10/1988 | Kaneko et al. | 369/266 |
| 4,859,922 | 8/1989 | Tauchenitz et al. | 318/628 |
| 4,868,549 | 9/1989 | Affinito et al. | 340/710 |
| 4,885,565 | 12/1989 | Embach | 340/407 |
| 4,918,365 | 4/1990 | Tanuma et al. | 318/685 |
| 4,995,483 | 2/1991 | Moseley et al. | 188/162 |

Primary Examiner—William M. Shoop, Jr.
Assistant Examiner—Brian Sircus
Attorney, Agent, or Firm—John G. Mesaros

[57] ABSTRACT

An apparatus for controlling conditions in response to an operator input, the apparatus including a rotary knob coupled to the shaft of the rotor of a stepper motor having first and second stator windings, in quadrature, with each winding being center tap grounded to provide first and second winding portions for each winding. One pair of first winding portions are used for providing pulse inputs to a microprocessor on rotation of the knob, in either direction, via a pulse control system, with the microprocessor providing command signals to a braking control system, which includes a direct current power control source, which may be either a voltage or current control source. The power control source, in turn is in circuit relation with the pair of second winding portions. On command of the processor, a force or torque is applied to the rotor, by means of energization of the other pair of winding portions, with the force being in opposition to the direction of rotation of the knob, the force being in proportion to the applied power. Under control of a microprocessor, the force may be intermittently applied to simulate a mechanical detent arrangement, or a constant force for braking, either of which provides tactile feedback to the operator.

8 Claims, 3 Drawing Sheets

5,189,355

INTERACTIVE ROTARY CONTROLLER SYSTEM WITH TACTILE FEEDBACK

FIELD OF THE INVENTION

This invention relates to video tape recording systems, and more particularly to a rotary control knob utilizing a stepper motor for tactile feedback for use in such systems.

BACKGROUND OF THE INVENTION

Professional video tape recording and editing equipment contains various operator manipulated controls, both rotary and linear controls, as well as push-button controls. In video tape reproducing apparatus, certain functions or modes are initiated under operator manual control, such as shuttle, jog or variable play speed, where a single knob is used for multiple functions and each function requires that the knob have a different set of mechanical characteristics.

In the use of such rotational control devices, it is preferable that such devices have a "feel" representative of the type of control or operation being effected. In particular, upon manual rotation by an operator, through a given angular displacement, or to a present angular position, at a given rotational speed, or upon accelerated rotation, ideally through the use of the tactile sense, the operator should receive tactile feedback of the extent and limit of motion.

In one such device, shown and described in U.S. Pat. No. 4,560,983, entitled Dynamically Responsive Control Device and System, issued Dec. 24, 1985 to Williams and assigned to Ampex Corporation, the assignee of the present invention, a knob is coupled to a shaft, a tachometer and a particle brake, with a control system receiving information from the tachometer to control the operation of the particle brake to thereby provide tactile feedback to the operator.

Another such device is shown and described in U.S. Pat. No. 4,859,922, entitled System for Controlling the Operating Mode of a Controlled Apparatus, such patent issuing to Tauchenitz et al., on Aug. 22, 1989. The patent discloses an apparatus control system including an operating knob having a toroidal coil positioned concentrically with respect to the axis of rotation thereof with a brake magnetically coupled to the coil and mechanically coupled to the knob, the brake being effective up to a predetermined angular deflection. Direction of rotation, rotary or angular deflection from a zero or null position, and axial deflection or shift of the shaft, coupled to the knob, is sensed or scanned, and knob movement signals are derived which are coupled to an electronic processing system.

A traditional method for accomplishing the tactile feel in a video tape recording system is to use an optical encoder coupled with a magnetic particle brake, with the two assembled into a single unit. The output of the encoder is decoded into direction information, and the particle brake is used to provide the detent or feedback information to the operator through the knob. Such devices are very expensive, in component cost as well as assembly.

Such prior art devices require special construction that adds to the cost of such knobs. Furthermore, such devices tend to be complicated in operation as well as construction.

In accordance with the present invention, there is provided a new and improved rotary control device with tactile feedback, utilizing a stepper motor coupled for rotation by a control knob.

SUMMARY OF THE INVENTION

The foregoing and other objects of the invention are accomplished by providing a rotary knob coupled to the shaft of the rotor of a stepper motor having first and second stator windings, in quadrature, with each winding being center tap grounded to provide first and second winding portions for each winding. One pair of first winding portions are used for providing pulse inputs from the stepper motor to a microprocessor on rotation of the knob, in either direction, via a pulse control system, with the microprocessor providing command signals to a braking control system, which includes an analog direct current voltage control source. The voltage control source, in turn is in circuit relation with the pair of second winding portions. On command of the processor, a force or torque is applied to the rotor, by means of energization of the other pair of winding portions, with the force being in opposition to the direction of rotation of the knob, the force being in proportion to the power applied to the motor. Under control of the microprocessor, the force may be applied to provide braking or momentarily applied to simulate a mechanical detent force at a given one or more angular displacement positions of the knob.

Other objects, features and advantages of the invention will become apparent from a reading of the specification, when taken in conjunction with the drawings, in which like reference numerals refer to like elements in the several views.

DESCRIPTION OF THE PREFERRED EMBODIMENT

System Overview

Figure 1:
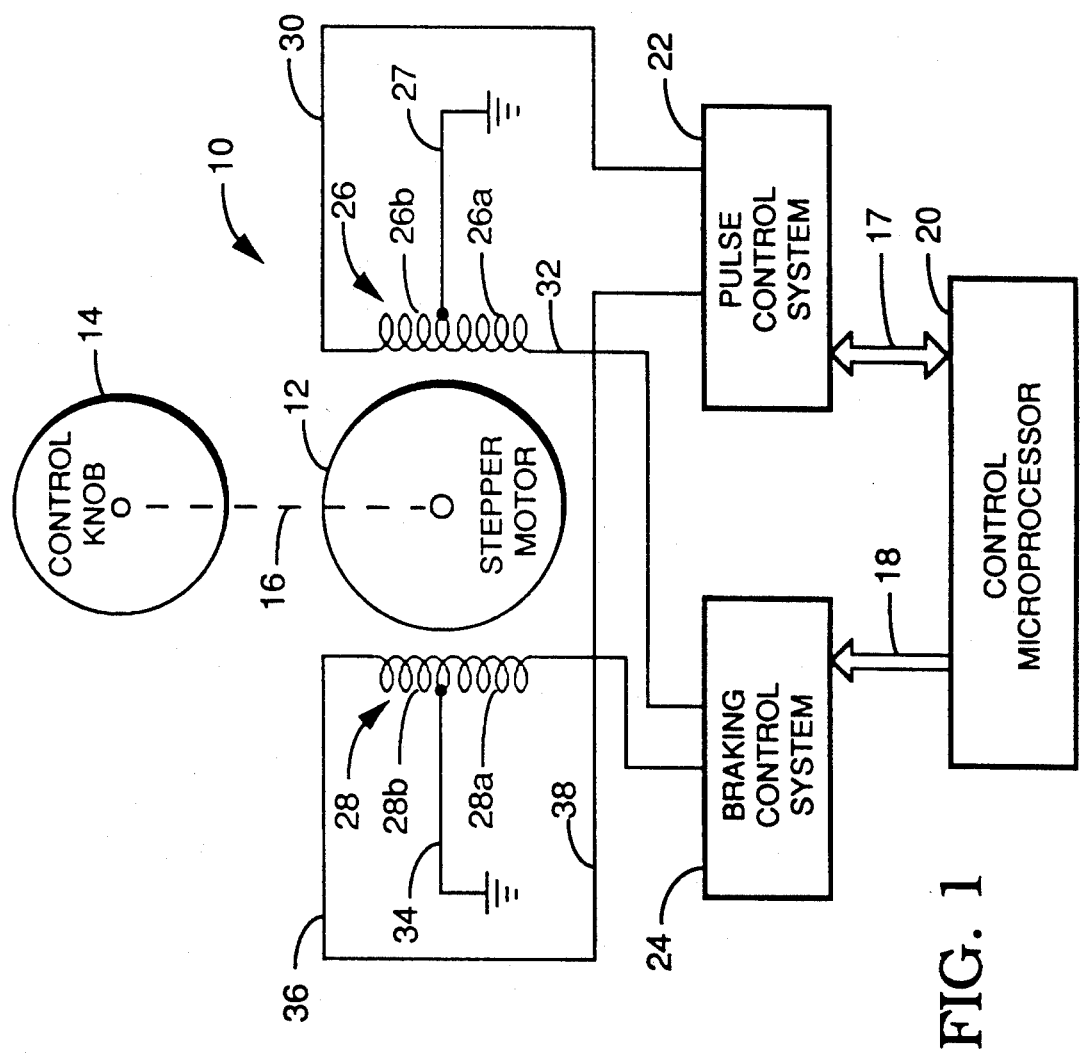
FIG. 1 is a block diagram of the interactive rotary controller system according to the invention.

Referring now to the drawings, and particularly to FIG. 1, there is shown a block diagram of the interactive rotary controller system, generally designated 10, which includes a stepper motor 12, mechanically coupled to a rotary knob 14, via shaft 16. The stepper motor 12 is a commercially available stepper motor and the details thereof are unnecessary to a full understanding of the invention. A control microprocessor 20 communicates bi-directionally with the pulse control system 22 via communications path 17 and provides outputs via communications path 18 to the braking control system 24, with both systems 22 and 24 being coupled to the stepper motor windings, generally designated 26 and 28, respectively. Each coil or winding is generally identical, and the two windings 26, 28 are constructed in quadrature within the stepper motor 12 for an electrical phase relationship of ninety degrees. Winding 26 is provided with a center tap lead at 27 which is connected to ground, with the outer leads 30 and 32 of the winding 26 being electrically connected to the pulse control system 22. Similarly, the winding 28 has a grounded center tap lead 34, with the outer leads 36 and 38 being electrically connected to the braking control system 24. With the grounded center taps, each winding 26 provides first and second winding coil halves or portions 26a, 26b and 28a, 28b, respectively.

As will be described, a respective set of winding portions 26a and 28a of windings 26 and 28, respectively, receive signals from the brake control system 24 which applies direct current voltage to the motor winding portions 26a, 28a to provide braking, while the pulse control system 22 identifies and counts winding pulses upon rotation of the shaft 16 via control knob 14, and formats or decodes the pulses from the second set of winding portions 26b and 28b according to speed, direction and angular position, for use by the control microprocessor 20. In other words, one half of each winding 26, 28 is used for braking and the other half of each winding is used for signals or pulses to effect input to the microprocessor as to existing conditions of rotation, angle of rotation, as well as speed and acceleration of rotation of the control knob 14.

Figure 2A:
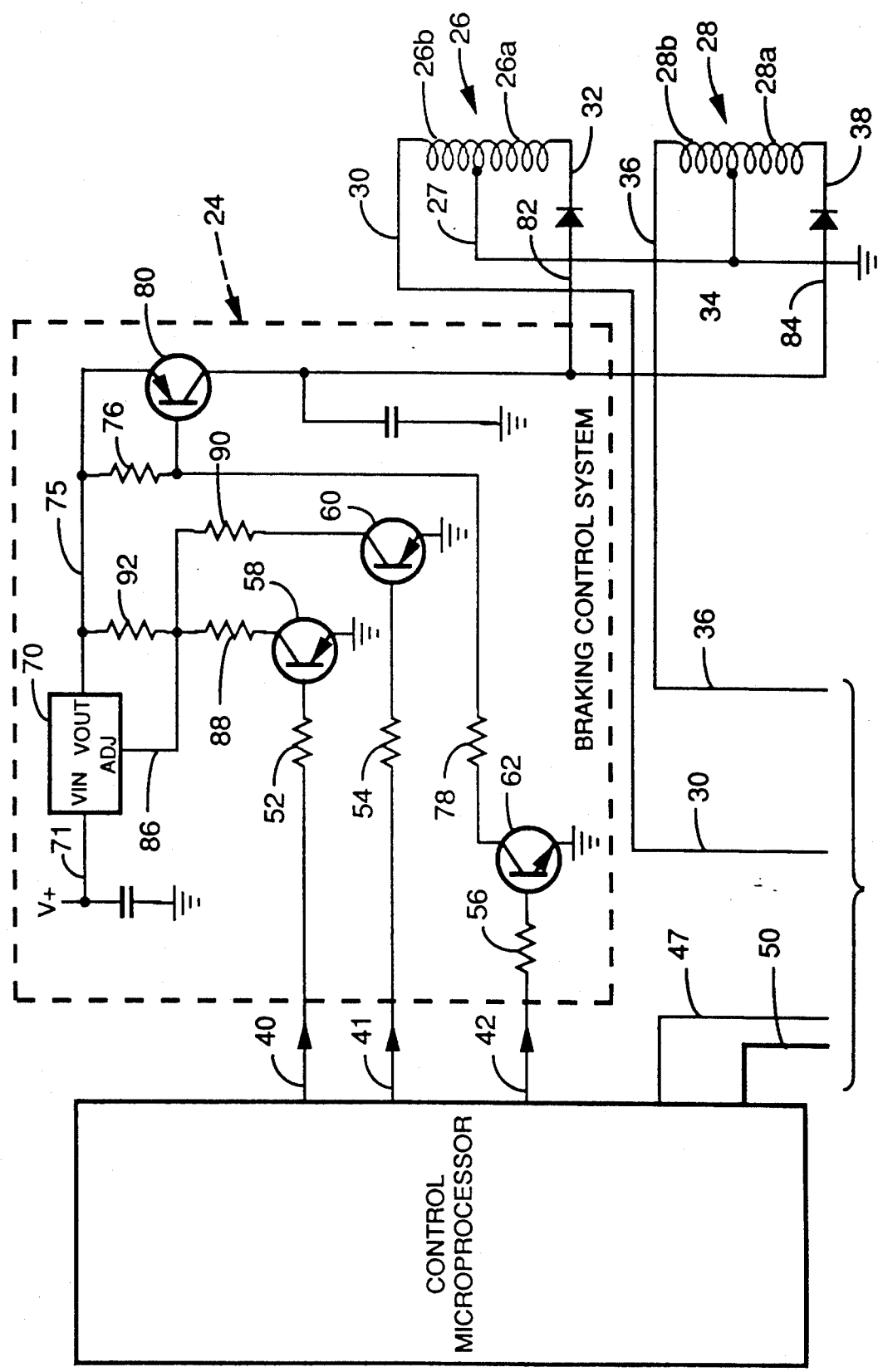
FIGS. 2A and 2B (collectively referred to as FIG. 2) are two parts of a more detailed block diagram of the logic of the controller system of FIG. 1.
Figure 2B:
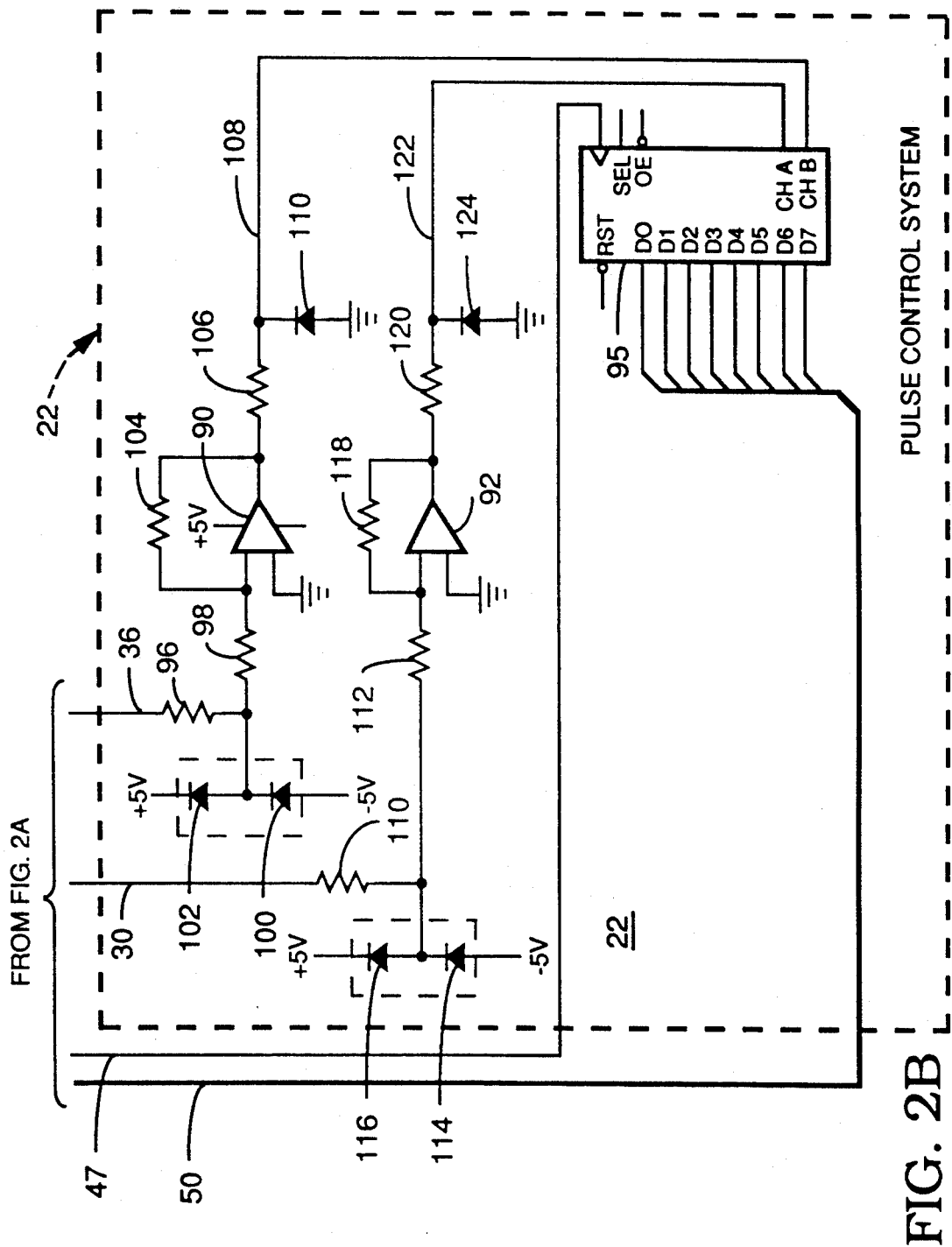

FIG. 2 is a more detailed block diagram of the implementation in which certain portions have been enclosed in broken lines to delineate the components included within each of the braking control system 24 and pulse control system 22. Where applicable, like reference numerals have been employed in FIG. 2. The microprocessor 20 has a first set of lines emanating therefrom to the braking control system 24, these being lines 40, 41 and 42, which together make up the communications path 18. Output lead 47 and input line 50 (an eight bit line) collectively comprise the bi-directional communications path 17 between the microprocessor 20 and the pulse control system 22.

Braking Control System

From the microprocessor, the three leads 40, 41 and 42, respectively, provide signals to the braking control system 24 for "detent on", "brake on" and "both brake and detent off". Each lead 40–42, in turn, is connected through a generally identical current limiting resistor 52, 54 and 56, respectively, to the base of a control transistor 58, 60 and 62, each of which is a generally identical NPN transistor connected in a common emitter configuration, that is, the emitters thereof are grounded. As will be explained, the control transistors 58, 60 and 62 are in circuit relation between a direct current voltage source controller 70 and the two winding halves or portions 26a, 28a of the windings 26, 28. Depending on the nature of the inputs over leads 40–42 from the processor 20, direct current power will be supplied from the voltage source controller 70, at a controlled voltage level, for a controlled duration and in a controlled pattern of voltage, depending on the action by the operator with respect to the control knob 14.

The voltage source 70 includes a VIN input over lead 71, which is coupled to a positive direct current voltage source 72 (V+ of about 24 volts) and through a blocking or smoothing capacitor 73 to ground. The output VOUT appearing on lead 75 is in circuit relation with the collectors of transistors 58, 60 and 62 to provide a controllable and controlled positive bias, as well as to the emitter of a PNP blocking or winding isolating transistor 80, the base of which is coupled to lead 75 through bias resistor 76, and to the collector of transistor 62 via current limiting resistor 78. The collector of blocking or winding isolating transistor 80 is coupled to one set of winding halves 26a, 28a via diodes 82, 84, which are coupled respectively to leads 32, 38 of the windings 26, 28.

The voltage source 70 includes a voltage control or adjustment input ADJ accessible via lead 86, which is connected to the collectors of both transistors 58 and 60, through bias resistors 88 and 90, respectively. That is, the ADJ input to voltage source 70 is in circuit relation with the collector to emitter paths of detent and brake control transistors 58 and 60, respectively. Lead 86 is coupled, via resistor 92 to the output lead 75 of the voltage source controller 75. Thus, lead 86 is at a potential determined by the midpoint of a voltage divider consisting of resistors 88 and 92 of detent control transistor 58, on the one hand, and the voltage divider consisting of resistors 92 and 90 of the braking control transistor 60, on the other hand.

For control and sensitivity purposes, the value of the resistor 90 and the value of resistor 88 can be varied to provide any desired output voltage or ratio. The reason for this is that the control transistor 60 is the braking control transistor, for which it is desirable to provide a higher power output pulse for control of the output. On the other hand, the transistor 58 is the detent control transistor and provides intermittent control of a given lesser duration to simulate the force or action of detenting of the knob 12 at predetermined angular positions, the value of and command for these being under control of the processor 20.

With respect to the blocking or isolating transistor 80, control is effected in accordance with the braking transistor 60 and detent transistor 58 in the absence of conduction of the gating transistor 62 which is coupled in the base to emitter path of the PNP blocking transistor 80. The emitter to base voltage bias is established by the value of the output voltage VOUT on lead 75 of voltage controller source 70 via resistor 76. The base to collector bias of blocking or winding isolating transistor 80 is established, via the collector to grounded emitter path of gating transistor 62, as limited by resistor 78 in series relation therewith. Thus resistors 76 and 78 form a voltage divider, the value at the connection point of the two resistors providing the base voltage to transistor 80. The value of resistor 76 is an order of magnitude of about six times greater than the value of resistor 78 (10,000 ohms versus 1,560 ohms), as a result of which, with gating transistor 62 conductive (signifying a BOTH OFF signal), the base of blocking transistor 80 approaches ground potential, providing a slight current through blocking or isolating transistor 80 to provide a small amount of resistive force on the rotary knob 14 and thus provide an initial slight resistive force to the knob 14 on initial rotation before any pulses are generated from the stepper motor 12. The reason for the blocking transistor 80 pertains to the characteristics of the stepper motor 12. If both windings are shorted, that is the ends of the winding halves connected together, there is a very high resistance to turning or rotation of the stepper motor 12, and, hence the control knob 14. This transistor 80 precludes the circuitry from effecting a shorted winding situation. In accordance with the invention, and using the stepper motor 12 as the operator input control device, via knob 14, the braking system 24 provides for a controlled and switchable application of power to the winding portions 26a and 26a, thus providing tactile feedback to the operator through the knob, for both braking and detent.

Pulse Control System

As inputs to the processor 20, the other winding portions 26b and 28b provide pulse signals to first and second comparators 90 and 92, the outputs of which are provided as first and second inputs to a pulse counter/decoder 95, which provides an eight-bit output, via path 50, to the processor 20 in response to rotation of the shaft 16 of the stepper motor 12. With the winding portions 26b and 28b in quadrature, directional information is obtained, as well as angular velocity information, angular displacement information and angular acceleration information. The counter/decoder 95 is a quadrature decoder which includes a combination of digital filter, quadrature decoder and counter with a parallel output from two phase differing input channels.

The comparators 90 and 92 form parts of first and second pulse control channels for providing pulsed input signals from winding portions 26b and 28b, each at a phase difference of ninety degrees relative to the other (in quadrature) for conversion into relative counts in the counter/decoder 95. The physical circuitry and operation of the comparators 90 and 92 are generally identical, with comparator 90 receiving an input to its non-inverting input via lead 36 through series connected resistors 96 and 98. The inverting input of comparator 90 is coupled to ground. The connection point of the two resistors 96 and 98 is coupled to the anode to cathode connection of two series connected diodes 100, 102, which form a clipper, and are collectively reverse biased between a negative bias voltage (−5 volts) and a positive bias voltage of like amount which are the same values of voltage for bias of the comparator 90. This is to prevent high voltage spikes from the motor passing into the comparator 90. A high value feedback resistor interconnects the output of comparator 90 with the non-inverting input thereof. The output is provided through resistor 106 over lead 108, to one input channel CH_A of the counter/decoder 95. A clamping diode 110 has the anode thereof coupled to ground and the cathode coupled to lead 108 and provides a TTL input to the counter/decoder 95.

Similarly, comparator 92 receives an input to its non-inverting input via lead 30 through series connected resistors 110 and 112. The inverting input of comparator 92 is coupled to ground. The connection point of the two resistors 110 and 112 is coupled to the anode to cathode connection of a second clipper formed of two series connected diodes 114, 116, which are collectively reverse biased between a negative bias voltage (−5 volts) and a positive bias voltage of like amount which are the same values of voltage for bias of the comparator 92. A high value feedback resistor 118 interconnects the output of comparator 92 with the non-inverting input thereof. The output is provided through resistor 120 over lead 122, to a second input channel CH_B of the counter/decoder 95. A clamping diode 124 has the anode thereof coupled to ground and the cathode coupled to lead 122 to provide a TTL input to the counter/decoder 95.

The counter/decoder 95 receives a high frequency clock signal from the microprocessor 20, via lead 47, and the two channel inputs (CH_A and CH_B) over leads 122 and 108, respectively, which are the phase shifted pulse streams from the winding halves 26b and 28b, respectively. The counter/decoder transmits an eight bit output over line 50 to the microprocessor 20.

System Operation

In operation, with the control knob 14 at its null or zero position, the output of counter/decoder 95 is at a preset level, or zero level. As the knob 14 is rotated, and hence, the rotor of the stepper motor 12, output pulse streams from the winding portions 26b, 28b of the stepper motor 12 appear on leads 30 and 36 with a phase difference. The pulse streams will be identical but out of phase in a first direction to indicate the forward direction of rotation. The frequency of the pulses will be determined by the speed of rotation of the knob 14. The pulses pass through the comparators 90 and 92, where, the input voltage levels are clipped, if large enough, by virtue of the clipper diode sets 100, 102 and 114, 116, respectively, with the clamping diodes 110 and 124, respectively, the outputs, clamping the voltages to the operational level required.

The phase-shifted pulse streams are serially input to the two input channels over leads 108 and 122, respectively, to CH_B and CH_A, respectively, to the counter/decoder 95. The counter/decoder 95 provides digital filtering of the RF input pulse streams, and decodes the phase information, and counts the pulses to thereby provide a parallel output over communication path 50 to the microprocessor 20. The eight bit output appearing on path 50 will include binary count information to the microprocessor 20 relating to parameters of motion of the knob 14, that is, speed, acceleration, direction and angular position of the knob 14 relative to the last position prior to rotation. The counter decoder 95 includes a reset input RST, the function of which is to receive a command from the microprocessor 95 to reset the counter within counter/decoder 95 to zero. Preferably, this is done after the completion of each increment of rotation of the control knob 14, with the microprocessor 95 storing the last position information as a reference point for any subsequent increment rotation. Other inputs to the counter/decoder include select (SEL) and output enable (OE) which are not shown as being connected. These two inputs receive commands, via the microprocessor 20, to allow inputs and enable outputs, as needed for operation.

This information will be interpreted by the microprocessor 20 which includes, in software, or in memory, among other things, information related to preset angular positions which correspond to detent positions of the control knob 14. In response to this information, the microprocessor 20 will output binary commands over leads 40-42 to the "detent on", "brake on" or "both off" control transistors 58, 60 and 62, respectively. In response to correspondence of the count (and phase) information from counter/decoder 95 to signify a desired or stored preset angular position, a command will be issued over lead 40 to detent control transistor 58, whereupon the voltage source 70 will provide a static direct current voltage to the winding halves 26a and 28a of the stepper motor 12, with the amount of power delivered being of a small value and of a time duration to simulate a detent, that is a momentary torque or force in opposition to the direction of rotation.

When desired by the system upon reaching a command limit, the microprocessor 20 will issue a binary output command over lead 41 to the brake control transistor 60, whereupon the voltage source 70 will provide a greater amount of power to the winding halves 26a and 28a of the stepper motor 12. For a more rapid rate of movement of the control knob 14, the microprocessor 20 will provide simultaneous commands over both leads 40 and 41 to thereby command the voltage source 70 to provide a still greater amount of power to the windings 26a and 28a, thereby providing a greater torque to the stepper motor 20 in opposition to the rate of movement of the control knob 14, or in response to rotation of the knob 14 to an angular position approaching the maximum degree of rotation for the application.

In accordance with the invention, a low cost commercially available stepper motor 12 has been provided as an input, via a control knob 14, to a microprocessor 20, for effecting a torque, in opposition to the direction of motion of the knob 14, to provide a tactile feel to the operator, with the braking torque duration being controllable to simulate a detent, a moderate continuous braking force for the duration of rotation, or a greater torque to resist rapid acceleration or denote approaching limits of rotation.

While there has been shown and described a preferred embodiment, it is to be understood that various other adaptations and modifications may be made within the spirit and scope of the invention.

What is claimed is:

1. An apparatus comprising:
   motor means having a shaft and first and second windings, each of said windings having first and second portions;
   a manually rotatable member coupled for rotation with said shaft;
   processor means;
   means coupled to given ones of said first and second winding portions and responsive to rotation of said member for providing signals from said motor means to said processor means indicative of parameters of motion of said member; and
   output means coupled to said processor means and to the other ones of said first and second winding portions for receiving commands from said processor means and energizing said other ones of said first and second winding portions for providing a force on said shaft in opposition to the direction of the force of rotation of said member.

2. The apparatus of claim 1 wherein said motor means is a stepper motor.

3. The apparatus of claim 1 wherein said parameters of motion include at least one speed of movement, direction, and angular rotation, 4. The apparatus of claim 3 wherein said motor means is a stepper motor and the windings are in quadrature.

5. The apparatus of claim 1 wherein said manually rotatable member is a control knob coupled to the shaft of the motor means.

6. The apparatus of claim 4 wherein said means coupled to given ones of said first and second winding portions includes comparator means for receiving said signals from said motor means.

7. The apparatus of claim 5 wherein said comparator means includes a comparator for each of said first and second winding portions and said means coupled to given ones of said first and second winding portions includes decoder means for receiving the output of both said comparators for providing information relative to the direction of rotation based on phase differences in said signals from said motor means.

8. In a processor controlled video tape recording system, a method for providing a tactile feedback to an operator on rotation of a control knob, said method comprising:
   providing motor means having a shaft and first and second windings, in quadrature, each of said windings being divided into first and second portions;
   connecting the control knob for rotating the shaft of said motor means;
   decoding signals from a given ones of said first and second winding portions on rotation of the knob to provide information relating to parameters of motion of the knob;
   under control of the processor, providing power to the other ones of said first and second winding portions for providing torque on said motor means in opposition to the direction of rotation of the control knob.

* * * * *